(12) United States Patent
Halberstadt

(10) Patent No.: US 9,998,017 B2
(45) Date of Patent: Jun. 12, 2018

(54) CONTROLLER FOR A RESONANT CONVERTER

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/062,433

(22) Filed: Mar. 7, 2016

(65) Prior Publication Data

US 2016/0268913 A1  Sep. 15, 2016

(30) Foreign Application Priority Data

Mar. 13, 2015 (EP) .................................... 15159086

(51) Int. Cl.
  *H02M 3/335* (2006.01)
  *H02M 3/337* (2006.01)
  *H02M 1/00* (2006.01)

(52) U.S. Cl.
  CPC ..... *H02M 3/33546* (2013.01); *H02M 3/3376* (2013.01); *H02M 2001/0032* (2013.01); *Y02B 70/1433* (2013.01); *Y02B 70/16* (2013.01)

(58) Field of Classification Search
  CPC ......... H02M 2001/0009; H02M 3/158; H02M 3/1584; H02M 1/32; H02M 2001/0032; H02M 3/1588; H02M 3/33546; H02M 3/3376; Y02B 70/1433; Y02B 70/1466; Y02B 70/16
  See application file for complete search history.

(56) References Cited

U.S. PATENT DOCUMENTS

| 8,339,817 | B2 | 12/2012 | Halberstadt |
| 2011/0002145 | A1 | 1/2011 | Halberstadt |
| 2011/0103098 | A1 | 5/2011 | Wu et al. |
| 2011/0149607 | A1 | 6/2011 | Jungreis |
| 2012/0163039 | A1* | 6/2012 | Halberstadt ......... H02M 3/3376 363/21.02 |
| 2014/0313790 | A1 | 10/2014 | Feng et al. |

FOREIGN PATENT DOCUMENTS

| EP | 2 469 696 A1 | 6/2012 |
| WO | WO-2009/004582 A1 | 1/2009 |
| WO | WO-2009/098604 A1 | 8/2009 |

OTHER PUBLICATIONS

Extended European Search Report for Application No. 15159086.6 (dated Sep. 23, 2015).
Feng, Weiyi et al; "Optimal Trajectory Control of LLC Resonant Converters for LED PWM Dimming"; IEEE Transactions on Power Electronics, vol. 29, No. 2; pp. 979-987 (Feb. 2014).
Oruganti, Ramesh et al; "Resonant Power Processors, Part II—Methods of Control"; IEEE Transactions on Industry Applications, vol. 1A-21, No. 6; pp. 1461-1471 (Nov./Dec. 1985).

* cited by examiner

*Primary Examiner* — Adolf Berhane
*Assistant Examiner* — Henry Lee, III

(57) ABSTRACT

A controller for a resonant converter, the resonant converter comprising a first switch and a second switch. The controller configured to: close the first switch to start a half cycle of operation; open the first switch before completion of the half cycle; maintain the first switch and the second switch in an open state in order to define a stop-interval; and end the stop-interval by closing the second switch.

14 Claims, 9 Drawing Sheets

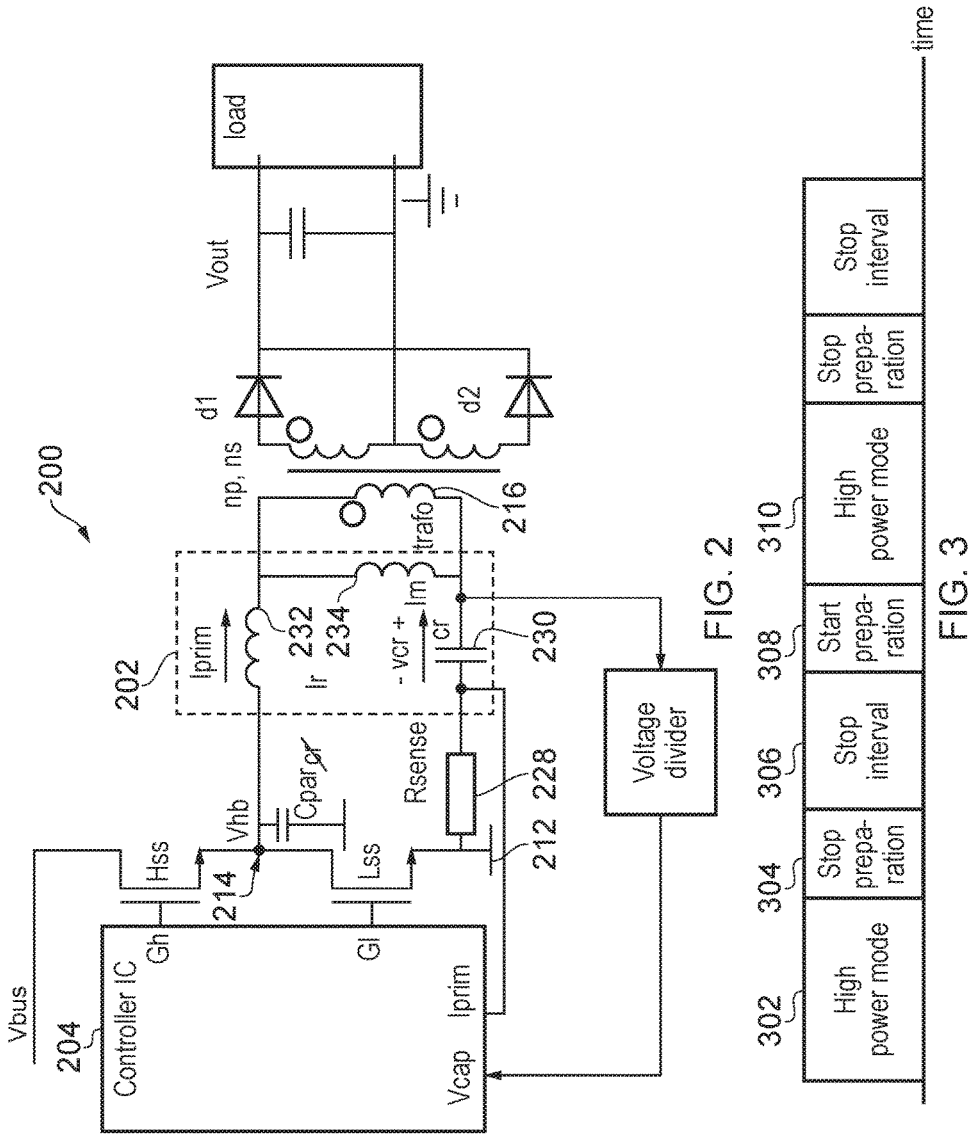

CONTROLLER FOR A RESONANT CONVERTER

This disclosure relates to controllers for resonant converters.

CROSS-REFERENCE TO RELATED APPLICATIONS

This application claims the priority under 35 U.S.C. § 119 of European patent application no. 15159086.6, filed Mar. 13, 2015 the contents of which are incorporated by reference herein.

BRIEF SUMMARY

According to a first aspect there is provided a controller for a resonant converter, the resonant converter comprising a first switch and a second switch, the controller configured to:
  close the first switch to start a half cycle of operation;
  open the first switch before completion of the half cycle;
  maintain the first switch and the second switch in an open state in order to define a stop-interval; and
  end the stop-interval by closing the second switch.

In this way, different switches are: (i) opened before completion of the half cycle before the stop-interval; and (ii) closed to end the stop-interval, which enables improved performance of the SMPS. This can be advantageous because the SMPS can return to a high-power-mode of operation after the stop-interval more quickly than would be the case if the same switch were used. In particular, information for operating the SMPS in the high-power-mode of operation after the stop-interval can be obtained quickly and efficiently.

The controller may be configured to operate the resonant converter in the following modes of operation: a high power mode of operation; a stop-preparation mode of operation; a stop mode of operation; and a start-preparation mode of operation.

In the high power mode of operation, the controller may be configured to operate the first and second switches when a resonant converter operating parameter (for example the voltage across a resonant capacitor) reaches one or more threshold values. A half cycle of operation may be defined as the period of time between successive switching operations. In the stop-preparation mode of operation, the controller may be configured to close the first switch to start a half cycle of operation and open the first switch before completion of the half cycle. In the stop mode of operation, the controller may be configured to maintain the first switch and the second switch in an open state. In order to transition from the stop-mode of operation to the start-preparation mode of operation, the controller may be configured to close the second switch.

The controller may be configured to define the beginning of the stop-preparation mode of operation as an instant in time at which the first switch is closed.

The controller may be configured to define the end of the start-preparation mode of operation as an instant in time at which the first switch is closed for the second time after the end of the stop interval.

The start-preparation mode of operation may include at least four operations of the second switch, including the operations that define the start and the end of the start-preparation mode of operation. In this way, at least 2 complete high-power half cycles can occur during the start-preparation mode of operation. This can enable a symmetry of operation to be effectively set.

The controller may be configured to define the end of the start-preparation mode of operation as an instant in time at which the first switch is closed for the first time after the end of the stop interval.

The controller may be configured to define the end of the start-preparation mode of operation as an instant in time at which a resonant converter operating parameter (for example the voltage across a resonant capacitor) reaches one or more threshold values.

The controller may be configured to:
  operate the resonant converter in a continuous conduction mode of operation,
  apply an offset to one or more threshold values in accordance with an expected-difference-value in order to determine one or more offset-threshold values; and
  for the first switching operation after the beginning of the start-preparation mode of operation, operate the first and second switches when the resonant converter operating parameter (for example the voltage across a resonant capacitor) reaches the one or more offset-threshold values.

The expected-difference-value may represents a difference between (i) a level of the resonant converter operating parameter at the end of a half cycle in the high power mode of operation; and (ii) a level of the resonant converter operating parameter at the first switching operation after the beginning of the start-preparation mode of operation. The expected-difference-value may be a predetermined value.

The controller may be configured to, in the stop-preparation mode of operation, close and then open the second switch after the first switch is opened. This can reduce switching losses.

The first switch may be a high-side-switch and the second switch may be a low-side switch, or vice versa.

There may be provided a resonant converter comprising:
  a first switch;
  a second switch; and
  any controller disclosed herein, configured to control the first switch and the second switch.

There may be provided an integrated circuit comprising any controller disclosed herein.

There may be provided a method of operating a resonant converter, the resonant converter comprising a first switch and a second switch, the method comprising:
  closing the first switch to start a half cycle of operation;
  opening the first switch before completion of the half cycle;
  maintaining the first switch and the second switch in an open state in order to define a stop-interval; and
  ending the stop-interval by closing the second switch . . . .

There may be provided a computer program, which when run on a computer, causes the computer to configure any apparatus, including a controller, resonant converter, circuit or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

One or more embodiments will now be described, by way of example only, and with reference to the accompanying figures in which:

FIG. 2 shows another example LLC resonant converter;

FIG. 3 shows schematically a mode of operation of a resonant converter;

Examples disclosed herein relate to resonant converters, and in particular to a low power mode of operation of a resonant converter.

Power converters for consumer applications, such as adapters for laptops, typically operate at partial load under standby conditions for a relatively large part of their lifetime. Whilst functioning in this mode, it can be desirable to draw power from the mains supply at as low level as is conveniently possible. Therefore it can be desirable to use a power converter design for the power supply which operates with a high efficiency not only under full load conditions, but also for partial load, and particularly for no load operation. In this case the power supply still operates, but the load is completely removed, for example as is the case when a power adapter is unplugged from a laptop.

For powers larger than approximately 100 Watts full load, resonant LLC topology is a very interesting topology and commonly adopted due to its high efficiency, small volumes and high power density. However, one of the main disadvantages for resonant LLC topology is its relatively low efficiency under low load conditions, when operated using a 50% duty cycle. Losses in this mode of operation may be a multiple of the required standby power, which can be too high for some applications.

DETAILED DESCRIPTION

Figure 1:
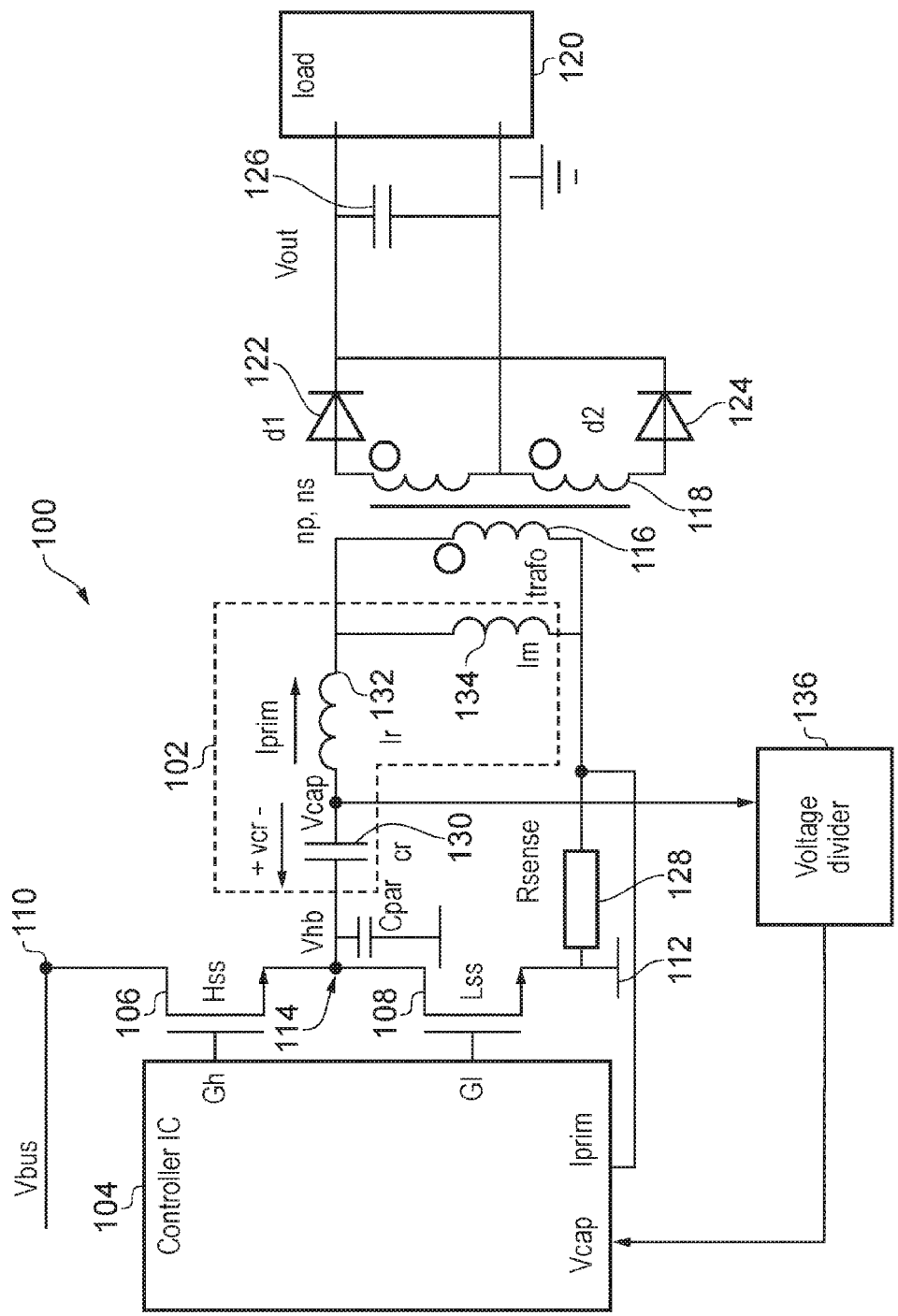
FIG. 1 shows an example LLC resonant converter.

FIG. 1 shows an LLC resonant converter 100. The LLC resonant converter 100 includes a resonant tank 102, a high-side-switch 106 and a low-side-switch 108. The high-side-switch 106 and the low-side-switch 108 are connected in series with each other between a bus voltage terminal 110 and ground 112. As is known in the art, during a normal mode of operation the high-side-switch 106 and the low-side-switch 108 are operated at the same time, with opposing polarities, in order to transfer a desired amount of energy from the bus voltage terminal 110 to the resonant tank 102. The node 114 between the high-side-switch 106 and the low-side-switch 108 can be referred to as a half-bridge-node 114, because the layout and operation of the high-side-switch 106 and the low-side-switch 108 can be considered as a half bridge structure. The voltage at this half-bridge-node 114 is referred to as Vhb.

The resonant tank 102 includes a resonant-capacitor cr 130, a first-resonant-inductor Ir 132, and a second-resonant-inductor Im 134, which are all connected in series with each other between the half-bridge-node 114 and ground 112. In this example, the resonant-capacitor cr 130 has a first plate that is connected to the half-bridge-node 114, and a second plate that is connected to a first terminal of the first-resonant-inductor Ir 132. A second terminal of the first-resonant-inductor Ir 132 is connected to a first terminal the second-resonant-inductor Im 134. A second terminal of the second-resonant-inductor Im 134 is connected to ground 112 through a sensing-resistor Rsense 128.

The resonant tank 102 is connected to a primary winding 116 of a transformer. In this example, the primary winding 116 of the transformer is connected in parallel with the second-resonant-inductor Im 134. The transformer provides galvanic isolation between a primary side and a secondary side of the LLC resonant converter 100. The transformer also includes a split secondary winding 118 that is inductively coupled to the primary winding 116, thereby defining a first-secondary-sub-winding and a second-secondary-sub-winding. Each of the secondary-sub-windings are connected in parallel with a load 120 through a rectifier diode 122, 124 such that, depending upon the polarity of the current that is induced in the secondary winding 118, a current with a single polarity is provided to the load 120. A filter capacitor 126 is also provided in parallel with each of the secondary-sub-windings in order to smooth the output voltage that is provided to the load 120.

A primary current, which corresponds to the current flowing through the first-resonant-inductor 132 in this example, will be referred to as Iprim, as shown in FIG. 1. A voltage across the primary winding 116 of the transformer, which corresponds to the voltage level at the node between the resonant-capacitor cr 130 and the first-resonant-inductor Ir 132 in this example, will be referred to as Vcap, as shown in FIG. 1.

The LLC resonant converter 100 includes a controller 104 that provides control signals to the high-side-switch 106 and the low-side-switch 108 such that they are opened and closed at times that result in a desired output voltage to the load 120. As shown in FIG. 1, Iprim and Vcap are used to control the switching of the LLC resonant converter 100 of FIG. 2. More particularly, an Iprim input terminal of the controller 104 is connected to a node between i) the sensing-resistor Rsense 128; and ii) the parallel arrangement of the primary winding 116 of the transformer and the second-resonant-inductor Im 134. Also a Vcap input terminal of the controller 104 is connected to a node between the resonant-capacitor cr 130 and the first-resonant-inductor Ir 132. In this example, an optional voltage divider 136 is used to decrease the level of Vcap to a value that can be handled by the controller 104 (which may be implemented as an integrated circuit (IC)) before it is provided as an input to the controller 104.

FIG. 2 shows another LLC resonant converter 200, which is similar to the LLC resonant converter of FIG. 1. Components of FIG. 2 that have already been described with reference to FIG. 1 will not necessarily be described again here and are given corresponding reference numbers in the 200 series.

In the example of FIG. 2 the resonant tank 202 is arranged differently to the resonant tank of FIG. 1; the resonant capacitor cr 230 is placed at the ground side of the transformer. More particularly, the first terminal of the first-resonant-inductor Ir 232 is connected to the half-bridge-node 214. The second terminal of the first-resonant-inductor Ir 232 is connected to the first terminal of the second-resonant-inductor Im 234. The second terminal of the second-resonant-inductor Im 234 is connected to the first plate of the resonant-capacitor cr 230. The second plate of the resonant-capacitor cr 230 is connected to ground 212 through the sensing-resistor Rsense 228. The Iprim input terminal of the controller 204 is connected to a node between the sensing-resistor Rsense 228 and the resonant-capacitor cr 230. The Vcap input terminal of the controller 204 is connected to a node between i) the resonant-capacitor cr 230 and ii) the parallel arrangement of the primary winding 216 of the transformer and the second-resonant-inductor Im 234.

FIG. 3 schematically shows how a low power mode of operation of a resonant converter can be implemented using a "stop-interval" 306, during which the high-side-switch and the low-side-switch are kept open so that no further energy is put into the resonant tank. Just before the stop-interval 306, the high-side-switch and the low-side-switch are operated in such a way as to define a stop-preparation-interval 304, which puts the resonant tank into a suitable state for entering the stop-interval 306. The stop-preparation-interval 304 is used to efficiently transition from a high-power-mode of operation 302 to the stop-interval 306. At the end of the stop-interval 306, a start-preparation-interval 308 can be implemented so that the resonant tank is brought into another suitable state for re-entering the high-power-mode of operation 310 in an efficient way.

As will be discussed in more detail below, a reason to include a stop-preparation-interval 304 is to move to a point in a state plane diagram where the resonant converter can be stopped with an acceptably low level of residual losses. Also, starting from this point for the next start-preparation-interval 308 can enable an acceptably small amount of switching losses to occur. The start-preparation-interval 308 and the stop-preparation-interval 304 can also be used to force the resonant tank to resume a high power trajectory according to a desired trajectory.

Figure 4:
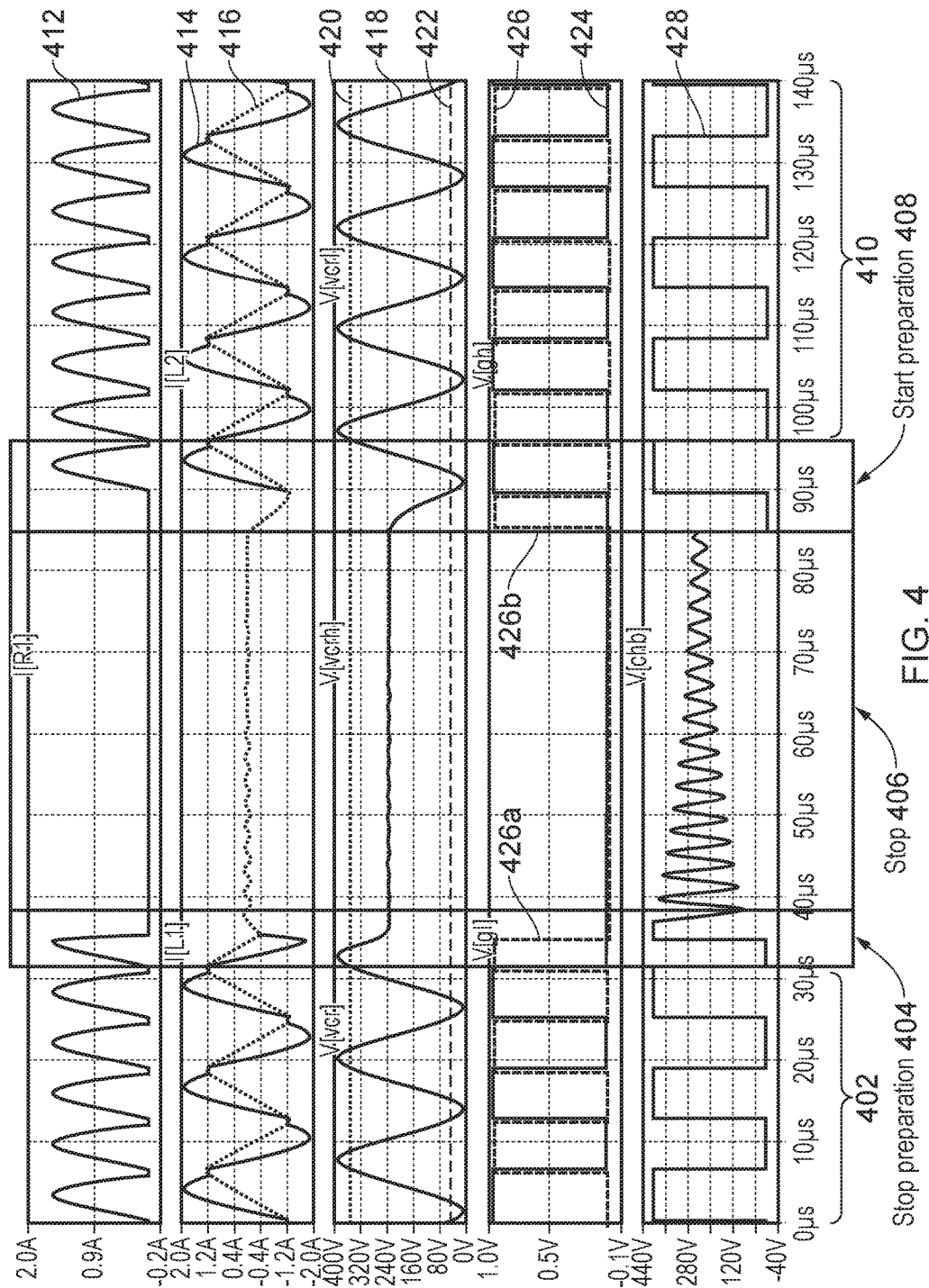
FIG. 4 shows simulated signals of the resonant converter of FIGS. 1 and 2 in a certain mode of operation, in the time domain.
Figure 5:
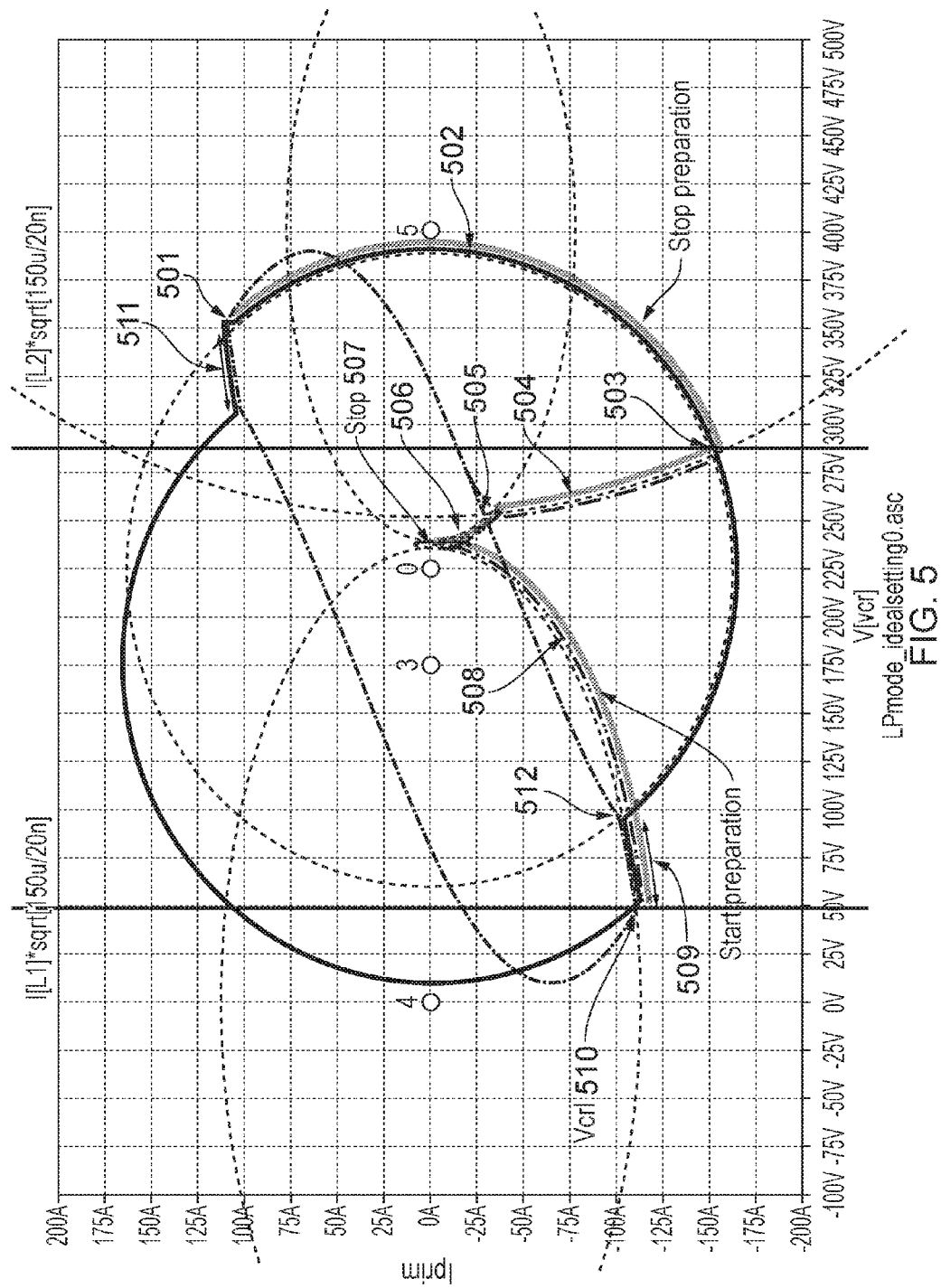
FIG. 5 shows a state plane representation of the signals in FIG. 4.

FIG. 4 shows a number of signals obtained by simulation of the resonant converter of FIG. 1 and FIG. 2 in a certain mode of operation, in the time domain. FIG. 5 shows a state plane representation of the same operation of the resonant converter that is illustrated by the time-domain signals of FIG. 4.

FIG. 4 identifies a first high-power-mode of operation 402, a stop-preparation-interval 404, a stop-interval 406, a start-preparation-interval 408, and a second high-power-mode of operation 410, in a similar way to that shown in FIG. 3. FIG. 4 shows the following signals:
  A first plot that shows the current supplied to the output capacitor and load at the output of the resonant converter 412;
  A second plot that shows:
    Current through the primary winding of the transformer 414;
    Current through the second-resonant-inductor Im 416;
  A third plot that shows:
    the voltage across the resonant-capacitor 418, this voltage is identified as vcr in FIGS. 1 and 2 (vcr may be considered to be a resonant converter operating parameter);
    a high-vcr-threshold 420 and a low-vcr-threshold 422, which are used to control the timing of switching the high-side-switch and low-side-switch in the high-power-mode of operation 402, 410;
  A fourth plot that shows:
    A control signal for the high-side-switch 424;
    A control signal for the low-side-switch 426;
  A fifth plot that shows the voltage at the half-bridge-node 428.

It can be seen from the fourth plot that, at the beginning of the stop-preparation-interval 404, the control signal for the high-side-switch 424 goes low, which represents opening the high-side-switch, and the control signal for the low-side-switch 426 goes high, which represents closing the low-side-switch. Partway through a half-cycle in the switching cycle in the stop-preparation-interval 404, the control signal for the low-side-switch 426 goes low (as shown in FIG. 4 by reference number 426a) such that both the high-side-switch and the low-side-switch are open. In this way, a half-cycle for which the low-side-switch would otherwise be closed is interrupted by opening the low-side-switch. The stop-preparation-interval 404 can be said to begin at the time that a half-cycle of the switching cycle of the SMPS begins, wherein that half-cycle is subsequently interrupted by prematurely (in terms of a normal mode of operation) opening the switch that was closed to start the half-cycle.

Then, at the beginning of the start-preparation-interval 408 (after the stop-interval 406), the control signal for the low-side-switch 426 goes high (as shown in FIG. 4 by reference number 426b), which represents closing the low-side-switch. That is, the same switch is closed: i) at the beginning of the stop-preparation interval 404; and ii) at the end of the stop-interval 406 to start transferring energy into the resonant tank again (which is also the beginning of the start-preparation-interval 408).

The start-preparation-interval 408 can be used to define a period of time during which a change to the level of output power being provided by the resonant converter is prohibited. For example, the controller may be prevented from changing the level of the high-vcr-threshold 420 and the low-vcr-threshold 422.

In the state plane diagram of FIG. 5, the voltage across the resonant capacitor (vcr) is plotted on the horizontal axis, and the primary current (Iprim) is plotted on the vertical axis. The passing of time is represented by a clockwise movement along a curve. In this representation, a sinusoidal waveform would result in a circular plot. (Although state plane representations are well known in the art, an annex is provided later in this document that provides further information about this subject.) As will be discussed below, FIG. 5 shows a high-power-mode-trajectory that is representative of a high-power-mode of operation, and a low-power-mode-trajectory that is representative of a low-power-mode of operation. The low-power-mode of operation includes a stop-preparation-interval, a stop-interval and a start-preparation-interval.

The high-power-mode-trajectory is defined as the repetitive sequence, following the solid curve in FIG. 5, along the following reference points/sections as they are illustrated in FIG. 5: 501-502-512-509-510-511-501. This high-power-mode-trajectory corresponds to the repetitive sequence between, for example, T=0ps and T=13 μs in FIG. 4.

The magnetising current drawn by the transformer in the high-power-mode of operation is also shown in FIG. 5 by a dot-dashed line. It can be seen that, during the high-power-mode of operation, the magnetising current (dot-dashed line)

coincides with the primary current (solid line) in the regions identified with reference numbers 509 and 511. These regions of coincidence correspond to the regions of coincidence between the same signals that are shown in the second plot of FIG. 4 in the high-power-mode of operation.

The low-power-mode-trajectory, in part, follows a different trajectory to the high-power-mode-trajectory. The part of the low-power-mode-trajectory that differs from the high-power-mode-trajectory is shown with a long dashed-dot line in FIG. 5. The magnetising current drawn by the transformer in the low-power-mode of operation is also shown in FIG. 5 by a long dashed-dot dot line.

The low-power-mode-trajectory starts in the same way as the high-power-mode trajectory at point 501, which corresponds to the start of the stop-preparation-interval that is shown in FIG. 4. After following trajectory 502 and reaching point 503, the low-side-switch is turned off, which corresponds to the control signal for the low-side-switch going low partway through the stop-preparation-interval in FIG. 4. This causes the low-power-mode-trajectory to follow reference points/sections 503-504-505-506-507. At about reference point 505 it can be seen that the low-power-mode-trajectory (long dashed-dot line) becomes coincidental with the magnetising current drawn by the transformer in the low-power-mode of operation (the long dashed-dot dot line).

The region of the low-power-mode-trajectory that is identified as the generally stationary point 507 in FIG. 5 corresponds to the stop-interval of FIG. 4. During the stop-interval both the high-side-switch and the low-side-switch are off/open. A small residual resonance remains, which is caused by a ringing of energy resonating in the converter circuit (for example between a Cpar capacitor and the first-resonant-inductor and the second-resonant-inductor (Ir+Im)). This resonance is visible in the state plane diagram as a spiral around point 507 and damps out over several 10ths of microseconds.

As long as the parasitic ringing has not damped out, part of the energy in this resonance can be re-used during the next switching cycle by starting the start-preparation-interval close to a valley of the ringing in the voltage Vhb at the half-bridge-node. This can also reduce or prevent hard-switching losses.

The low-power-mode-trajectory then continues from the stop-interval (reference 507 in FIG. 5) along trajectory 508-512-509-510-511-501, which corresponds to the start-preparation-interval shown in FIG. 4. At reference point 501, the start-preparation-interval ends, and the high-power-mode-trajectory is followed until the next stop-preparation-interval.

It can be seen from FIG. 5 that during the stop-preparation-interval and the start-preparation interval, a different trajectory is followed compared to the high power trajectory. However, at the end of the start-preparation-interval, a point 501 is reached that is common to both the low-power-mode-trajectory and the high-power-mode-trajectory. This is because point 503 (the time at which the low-side-switch is turned off partway through the stop-preparation-interval) was carefully chosen in order to result in equal values of the magnetising current at trajectory 509. The simulation illustrated by FIGS. 4 and 5 can therefore be considered as special case of this low power mode. More generally, the trajectories for the low power mode of operation and the high power mode of operation can be said to follow different paths. A significant effect is that now the output current during both half cycles is asymmetrical.

In some examples, efficiency is an important requirement for operation in low power mode. RMS losses and switching losses can be a dominant factor in determining the efficiency. RMS losses occur in parasitic resistances in the transformer and switches. As RMS losses in resistances are proportional to the square of the currents, the output currents in both half cycles should be as symmetrical as possible, especially when synchronous rectifiers are used (Ron). It can therefore be desirable to choose point 503 close to the optimum value for symmetrical currents.

As mentioned, a requirement for the low power mode in some examples involves setting the output current such that symmetry is achieved for both half cycles. This is particularly important when using the basic resonant converter circuit of FIG. 2 with the resonant-capacitor cr at the ground side. In some applications, sensing the exact duration of two subsequent high power half cycles can assist in efficiently setting the output current such that it is symmetric.

When operating a resonant converter in line with the signals represented by FIGS. 4 and 5, the shortest achievable low power period consists of:

1 high side half cycle (510-511-501) (that is, following the high-power-mode-trajectory); followed by a stop preparation interval (501-502-503-504-505-506-507, (that is, following the low-power-mode-trajectory); and a start preparation interval (507-508-512-509-510-511-501).

Within this interval, however, there is no full half cycle available for the low-side-switch, because it is interrupted at point 503, making it impossible to compare the low side half cycle with the high side half cycle timing. One option for addressing this difficulty is to make a low power cycle with at least two subsequent full half cycles. This however results in an undesirable delay because for a full period, at least the following sequence is required:

H-L-Hstop-L-H-Lstop,

Where:

H is a high side half cycle;

L is a low side half cycle;

Hstop is a low-power-mode sequence of stop-preparation-interval, stop-interval, and start-preparation-interval, which is initiated during a high side half cycle; and Lstop a low-power-mode sequence of stop-preparation-interval, stop-interval, and start-preparation-interval, which is initiated during a low side half cycle sequence.

This sequence however results in a more difficult state machine for controlling the sequence. Also, the sequence requires a relatively long repetitive period, which, due to the relatively large number of sub-intervals, results in a period time that may be longer than 50 µs. Such a long period of time may not be useable for some applications because operating frequencies of about 50-100 kHz risk generating audible noise, which can be unacceptable or undesirable.

Alternatively, it can be possible to add a full high power cycle to the start-preparation-interval such that a sequence of H-L-H-Lstop can be used. That is, for the example of FIG. 4, the end of the start-preparation-interval 408 can be extended to about 108 µs such that it includes another complete switching cycle. However, such sequence can be too long for some applications. The sequence can also be undesired because it can limit the lowest resonant tank frequency that can be used before getting audible noise issues. A further still disadvantage is the more complicated control, as now both a Hstop and a Lstop sequence should be controlled in order to achieve a symmetrical result.

Figure 6:
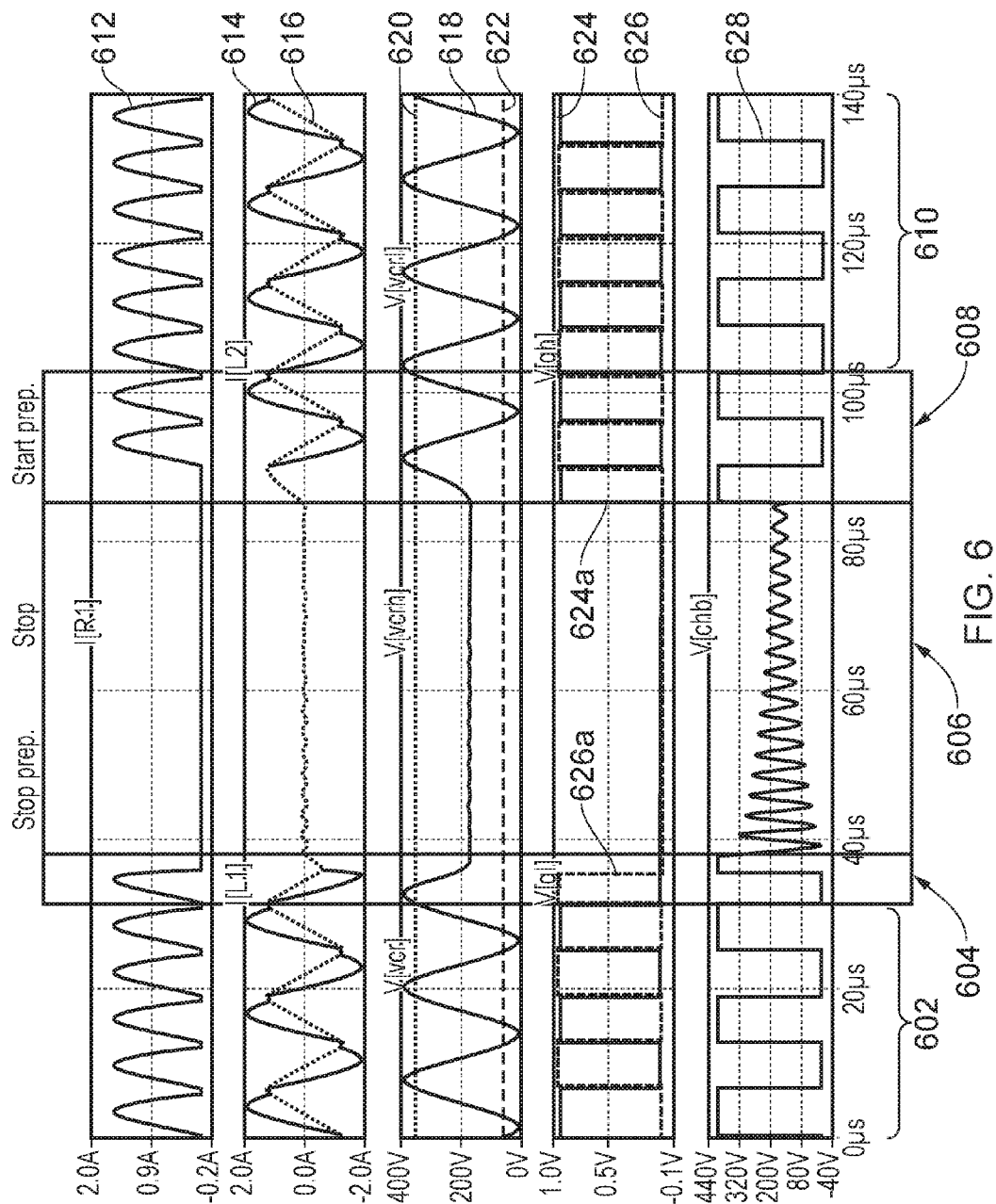
FIG. 6 shows simulated signals of the resonant converter of FIGS. 1 and 2 operating in DCM in the time domain.
Figure 7:
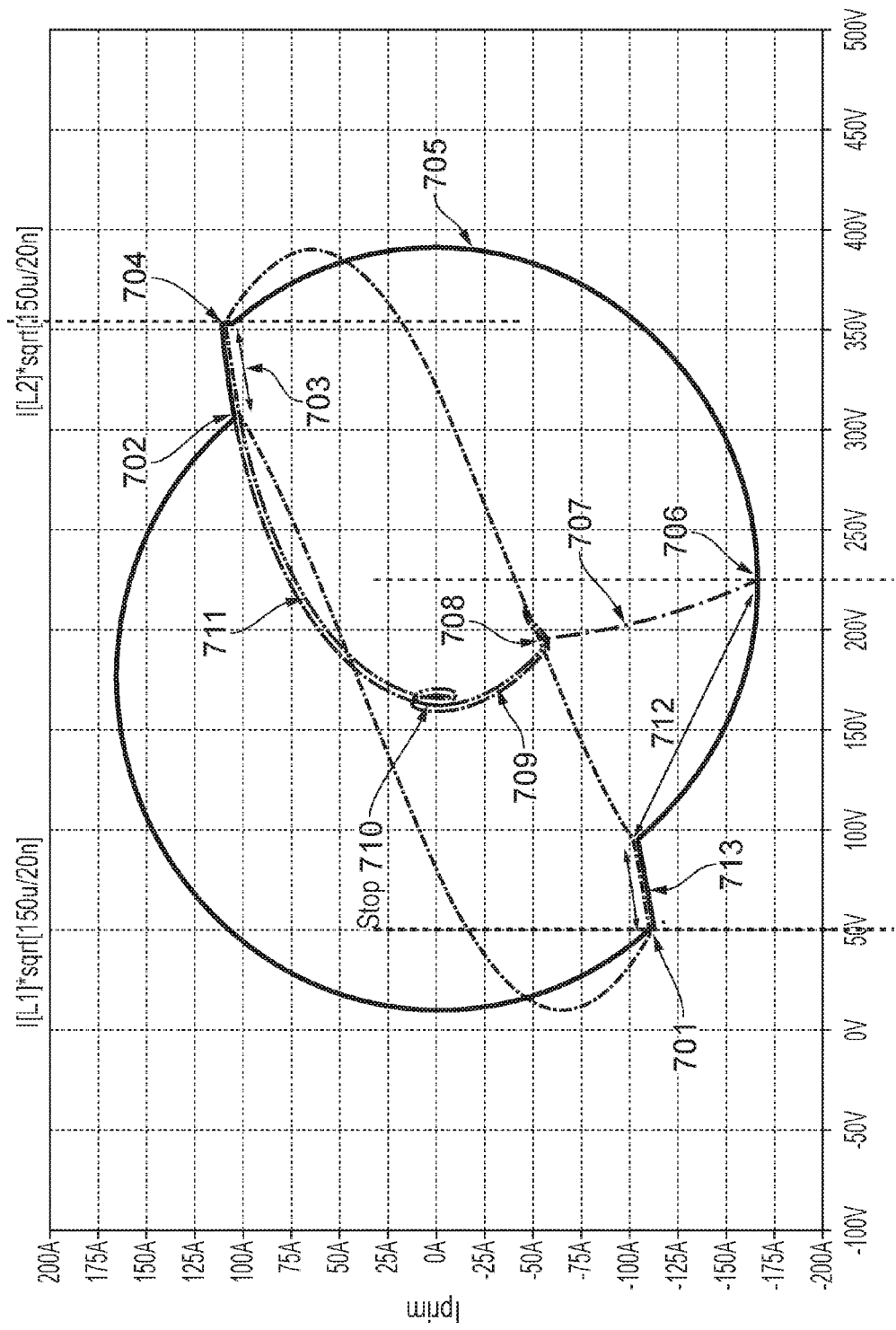
FIG. 7 shows a state plane representation of the signals in FIG. 6.

FIG. 6 shows a number of signals obtained by simulation of the resonant converter of FIG. 1 and FIG. 2 in another mode of operation, in the time domain. FIG. 7 shows a state plane representation of the same operation of the resonant converter that is illustrated by the time-domain signals of FIG. 6.

The signals shown in FIG. 6 correspond to those of FIG. 4, and have been given corresponding reference numbers in the 600 series. Any similarities between the signals of the two figures will not necessarily be described again with reference to FIG. 6.

As will be discussed below, the mode of operation represented by FIGS. 6 and 7 can address one or more of the disadvantages of the operation represented by FIGS. 4 and 5. In particular, the controller of the resonant converter closes 626a the low-side-switch at the start of the stop-preparation-interval 604, maintains the stop-interval 606 by maintaining the low-side-switch and the high-side-switch in an open state; and ends the stop-interval by closing 624a the high-side-switch. That is, different switches are operated at the beginning of the start-preparation interval 604 and at the end of the stop-interval 606. As discussed above, the stop-preparation-interval 604 can be said to begin at start of a half-cycle that is subsequently interrupted/cut short by opening the switch that was closed to start the half-cycle.

The signals of FIG. 6 are the same as those of FIG. 4, up until the end of the stop-interval 606. In the same way as FIG. 4, the low-side-switch is the last switch that is opened 626a before the stop-interval 606 in this example. In some examples however, additional switching operations may be performed during the stop-preparation-interval 604, after the last transition 626a of the control signal for the low-side-switch 626 but before the beginning of the stop-interval 606. Such additional switching operations may involve closing and then opening the high-side-switch, such that the control signal for the high-side-switch 624 transitions from low to high, and back to low before the end of the stop-preparation-interval 604. This can reduce the voltage drop across the high-side-switch, and so can result in lower conduction losses. However, it can require an additional gate charge sequence, and so more gate losses. A decision as to whether or not to turn the high-side-switch on and off during the stop-preparation-interval 604 can be based on a balance between gate drive losses (when turned on) and a difference in conduction losses: Iprim×Vj when the switch is not on; and Iprim×Ron when the switch is on. When the switch is not on, this results in a voltage drop Vj across the body diode of the switch being larger than Iprim×Ron.

As shown in FIG. 6, at the transition between the stop-interval 606 and the start-preparation-interval 608, the control signal for the high-side-switch 624 goes high (as shown in FIG. 6 by reference number 624a), which represents closing the high-side-switch. Then the start-preparation-interval 608 continues until at least a second high-to-low transition of the control signal for the high-side-switch 624. In some examples, additional switching operations may be performed during the start-preparation-interval 608, after the second transition of the control signal for the high-side-switch 624. In this way, additional high power cycles can be included in the start-preparation-interval 608. The end of the start-preparation-interval 608 can be defined by the result of a comparison between the voltage across the resonant capacitor (vcr) and a predetermined value (that is, by comparing a resonant controller operating parameter, in this case vcr, with a predetermined value). That is, the switches do not necessarily need to be controlled in accordance with a comparison of vcr 618 with vcr1 620 or vcr1 622—other predetermined values/signals could be used.

It will be appreciated that, in other examples, the low-to-high transition in a control signal at the beginning of the stop-preparation-interval 604 may be a transition in the control signal for the high-side-switch 624, in which case the first low-to-high transition in a control signal at the end of the stop-interval 606 will be a transition in the control signal for the low-side-switch 626. This mode of operation can therefore be generalised as:

(i) closing a first switch (which is a low-to-high control signal transition in FIG. 6), which can be defined as the beginning of a stop-preparation-interval. This switching operation can be considered as starting a half cycle of operation that will subsequently be interrupted before completion if a stop-preparation-interval is to be begun;

(ii) opening the first switch (which is a high-to-low control signal transition in FIG. 6) before completion of the half cycle that was started by the closing of the switch at step (i);

(iii) maintaining the first switch and a second switch in an open state in order to define a stop-interval; and (iv) ending the stop-interval by closing the second switch (which is a low-to-high control signal transition in FIG. 6).

The state plane diagram of FIG. 7 represents the same operation of the resonant converter that is illustrated by the time-domain signals of FIG. 6, in the same way that the state plane diagram of FIG. 5 represents the operation of the resonant converter that is illustrated by the time-domain signals of FIG. 4.

The high-power-mode-trajectory of FIG. 7 is the same as the high-power-mode-trajectory of FIG. 5, and is defined as the repetitive sequence, following the solid curve in FIG. 7, along the following reference points/sections as they are illustrated in FIG. 7: 704-705-706-712-713-701-702-704. The high-power-mode-trajectory includes two half cycles of the switching cycle of the SMPS: a first half cycle—704-705-706-712-713-701, and a second half cycle—701-702-704. The high-power-mode of operation may also be referred to as a normal mode of operation.

The low-power-mode-trajectory of FIG. 7 is different to the low-power-mode-trajectory of FIG. 5 in that the stop-preparation-interval and the start-preparation-interval are related to the same half cycle, in that the stop-preparation-interval finishes during a certain half cycle, and the start-preparation-interval begins at the start of the same half cycle. For the example shown in FIG. 7, the low-power-mode-trajectory sequence is:

(i) a stop-preparation-interval:
  (a) 704-705-706 (during which time the low-side-switch is on/closed as shown between T=32 µs and T=35 µs in FIG. 6),
  (b) 706-707-708-709-710 (during which time the low-side-switch is off/opened as shown between T=35 µs and T=38 µs in FIG. 6) (Hss on,). This can be considered as cutting short an active half cycle by opening the switch that would be closed until the end of the half cycle fi the SMPS continued along the high-power-mode-trajectory;

(ii) a stop-interval, 710, during which time the low-side-switch and the high-side-switch are kept off/opened. The end of the stop-interval 710 is defined by the closing of the high-side switch, which is the opposite switch to the one that was closed to begin the start-preparation-interval; and (iii) a start preparation-interval:
  (a) 710-711-702-703-704 (during which time the high-side-switch is on/closed as shown between T=85 µs and T=90 µs in FIG. 6), (b) 704-705-706-712-713-701 (which is a first high power half cycle, during which time: (I) the low-side-switch is on/closed; and (II) the high-side-switch is off/open, as shown between T=90 µs and T=96 µs in FIG. 6), (c) 701-702-703-704 (which is a second high power half cycle, during which time: (I) the high-side-switch is on/closed, and (II) the low-side-switch is off/open, as shown between T=96 µs and T=103 µs in FIG. 6).

Advantageously, the operation illustrated by FIGS. 6 and 7 includes two complete half cycles in the start-preparation-interval, after which the resonant converter is at the same point in the state plane representation as it was at the beginning of the stop-preparation-interval. Therefore, it is possible to efficiently sense the duration of both half cycles, without any unnecessary time delay or unnecessary long period time, which can be used for proper control of the symmetry of the output current pulses.

Also, the operation of FIGS. 6 and 7 allows use of a simple cycle for a low power mode of operation: L-H-Lstop or H-L-Hstop, which can avoid the need for a complicated control of the sequence and can allow proper control of the symmetry. This can make the low power mode practically applicable.

The instance in time 706 during the stop-preparation-interval at which the low-side-switch is turned off/opened, is defined by the result of a comparison between the voltage across the resonant capacitor (vcr) and a predetermined value. The predetermined value can be based on a linear combination of 701, 704.

The operation illustrated by FIGS. 6 and 7 could be modified such that the end of the start-preparation interval can be defined in a different way. For example, with reference to FIG. 6, the start-preparation-interval could end at an instant in time at which the high-side-switch is opened for the first time after the stop interval 606 (this switching operation is indicated as a high-to-low transition in the high-side-switch control signal 624). This instant in time corresponds to the first time that the low-side-switch is closed for the first time after the end of the stop interval 606 and is at 90 µs in FIG. 6. With reference to FIG. 7, the start-preparation-interval could be defined by the trajectory: 711-702-703-704.

A variant to the operation illustrated by FIG. 6 in 7 relates to determining when to interrupt the half cycle by opening a switch in the stop-preparation-interval 604, which is shown by the transition with reference 626a in FIG. 6. With reference to FIG. 7, this instant in time is identified with reference 706. This instant in time can be defined in accordance with a function of the voltage at the start of a half cycle (points 704 and 701 in FIG. 7), for example the voltage V(vcr) 704+701)/2. Alternatively, a feedback loop can be used that senses a feature of the high power half cycles during, or before, a start-preparation-interval, such as the duration of intervals 705+712+713 and 701-702-703-704, or a signal representing the current supplied to the load at the output of the resonant converter (shown as signal 612 in FIG. 6) during the half cycles, and then use a difference between both sensed signals to adapt vcr at 706. Such adapting can be performed by, for example, a slow integrating loop such that the difference is regulated to 0. This variant can also be used with other examples disclosed herein. An advantage associated with this operation is that a sufficiently symmetrical solution can be achieved for a relatively simple implementation.

The operation illustrated by FIGS. 6 and 7 is a discontinuous mode (DCM), so-called because the secondary side rectifier diodes do not conduct for the full half cycle. This can be seen in FIG. 6 by the load current 612 dropping to zero for a period of time in between half cycles. In FIG. 7, this results in the intervals marked with references 703 and 713 during which time the magnetising current matches the primary current, which causes the secondary side rectifier diodes not to conduct.

Figure 8:
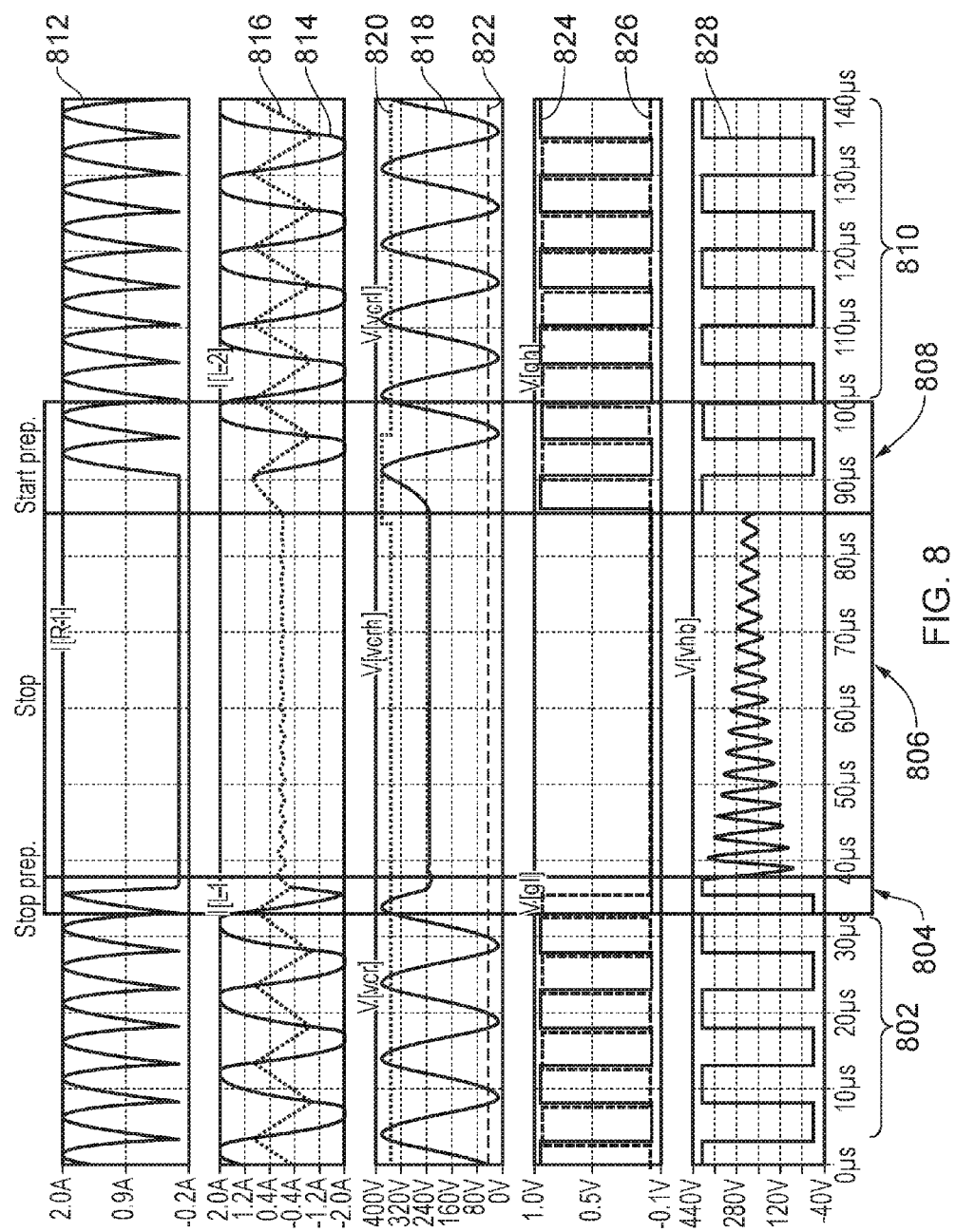
FIG. 8 shows simulated signals of the resonant converter of FIG. 1/FIG. 2 operating in CCM in the time domain.
Figure 9:
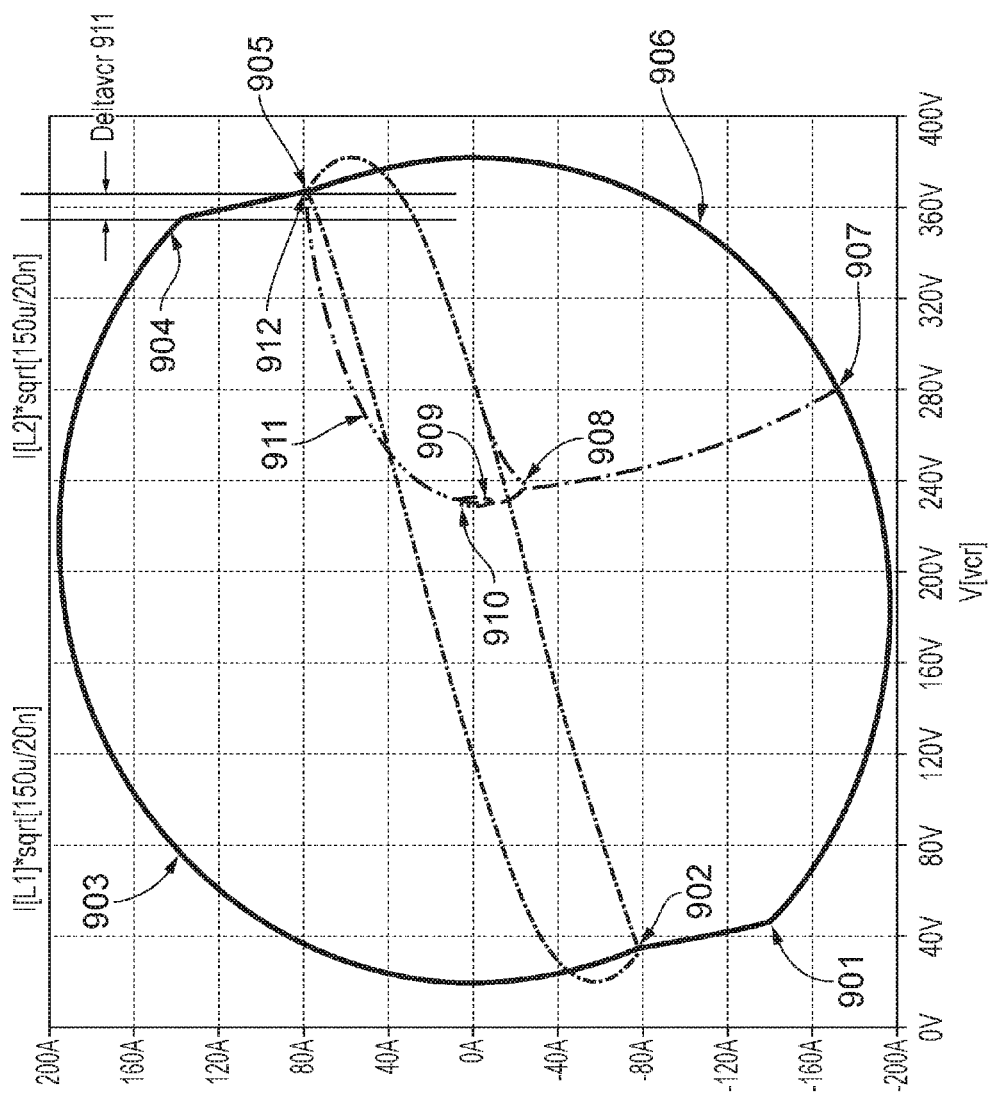
FIG. 9 shows a state plane representation of the signals in FIG. 8.

FIG. 8 shows time-domain signals that are similar to the signals of FIG. 6, although in this example the resonant converter is operated in a continuous conduction mode (CCM) of operation. FIG. 9 shows a state plane representation of the same operation of the resonant converter that is illustrated by the time-domain signals of FIG. 8. Operation in CCM can occur because of a different dimensioning of the resonant tank.

The signals shown in FIG. 8 correspond to those of FIGS. 4 and 6, and have been given corresponding reference numbers in the 800 series. Any similarities between the signals of the two figures will not necessarily be described again with reference to FIG. 8. Since the resonant converter is operating in CCM, the load current 812 does not drop to zero in-between half cycles.

Turning now to FIG. 9, a high-power-mode-trajectory is shown as 901-902-903-904-905-906-901. A low-power-mode-trajectory is similar to the DCM implementation of FIG. 7, and is as follows in FIG. 9:

(i) a stop-preparation-interval —905-906-907-908;

(ii) a stop-interval —909 and optionally 910. 909 represents a spiral trajectory 909 that corresponds to the ringing at the Vhb node during the stop interval. 910 is a stationary point in the state plane representation, and can be considered as optional inasmuch as the stationary point 910 is only reached if the ringing is completely damped out. This may only occur for sufficiently long stop-intervals;

(iii) a start-preparation-interval—911-912.

For DCM operation, as shown in FIG. 7, there is a common point 704 that represents both the end of a high power half cycle and the end of the start-preparation-interval. In CCM however, as shown in FIGS. 8 and 9, for the special case where the low-power-mode-trajectory follows partly the same trajectory as the high-power-mode-trajectory, there is a different requirement for finishing the high power half cycle. In FIG. 9: (i) the high power half cycle ends at point 904, at which time the high-side-switch and the low-side-switch are operated; and (ii) the start-preparation-interval ends at point 912. It can be seen from FIG. 9 that the points 904 and 912 do not coincide. The difference between the level of the voltage across the resonant-capacitor (vcr) at points 904 and 912 is Deltavcr 911. Deltavcr may be considered an "expected-difference-value". As shown in FIG. 8, this Deltavcr can be accounted for by applying an offset to the high-vcr-threshold 820, which is used to control the timing of switching the high-side-switch and low-side-switch as the resonant converter transitions from the low-power-mode-trajectory back to high-power-mode-trajectory (or in some examples from (i) a portion of the low-power-mode-trajectory that does not coincide with the high-power-mode-trajectory, to (ii) a portion of the low-power-mode-trajectory that does coincide with the high-power-mode-trajectory. The Deltavcr offset should be applied at an instant in time that the resonant converter moves back to a high-power-mode-trajectory. In the example of FIG. 8, the Deltavcr offset is added to the high-vcr-threshold 820 at the beginning of the start-preparation-interval 808 (T=85 μs). The high-vcr-threshold 820 plus the added Deltavcr offset may be considered to provide an offset threshold value, or an offset-high-vcr threshold. The Deltavcr offset is removed from the high-vcr-threshold 820 before the end of the start-preparation-interval 808, and more particularly, it should be removed before the second time that the vcr signal 818 reaches the vcrh threshold 820 during the start-preparation-interval 808. This is because the SMPS is not transitioning from the low-power-mode-trajectory to the high-power-mode-trajectory for the second peak in the vcr signal 818. This can be understood from FIG. 9: the first part of the start-preparation-interval 911-912 should be finished by the shifted vcrh 905, however after that the trajectory 906-901-902-903-904 is followed. Point 904 is vcrh without the shift, and so the shift should be removed before 903 finishes.

In a similar way to that described above with reference to FIGS. 6 and 7, the operation illustrated by FIGS. 8 and 8 could be modified such that the end of the start-preparation interval can be defined as an instant in time at which the high-side-switch is opened for the first time after the stop interval 806.

In some examples, the controller of the resonant converter can implement a state machine for setting the various modes and sub-modes of operation, and the state machine can be used to define when the Deltavcr offset is added and/or removed from the high-vcr-threshold 820.

Examples disclosed herein relate to a low power mode of a resonant converter. A high-power-mode of operation of the resonant converter can include a high-power-mode-trajectory that consists of two half cycles. The high-power-mode-trajectory can be interrupted by a stop-preparation-interval, a stop-interval, and a start-preparation-interval. The beginning of a half cycle, which is begun by closing a switch, defines the beginning of the stop-preparation-interval. The stop-interval is ended by closing the other switch. The start-preparation-interval may be started close to the moment at which a minimum occurs in the voltage across the switch that is to be turned on. In this way, the switch can be turned on at a valley or peak of the half-bridge-node in order to reduce or minimize switching losses. The start-preparation-interval during CCM operation can be finished when the voltage across the resonant capacitor is shifted with respect to its value at the end of the normal half cycle (as shown with reference 905 in FIGS. 9 and 904 for the normal half cycle), which can assist in providing symmetrical operation.

The examples of FIGS. 6 to 9 can have advantages over control methods for resonant converters that use the low power mode as described with reference to FIGS. 4 and 5, and examples in which a control method is based on frequency control with an adaptive tuning of the first and last pulse duration in order to follow a high power mode trajectory as closely as possible. Such a control method that is based on frequency control with an adaptive tuning is disclosed in a CPES paper entitled "Optimal Trajectory Control of LLC Resonant Converter for LED PWM Dimming" by Weiyi Feng, Dr. Fred C. Lee, Shu Ji from Jan. 15 2014.

Frequency control is an inferior method for controlling a low power mode of operation, for example due to low frequency dynamic issues. The examples of FIGS. 6 to 9 can improve on these dynamic issues by using resonant tank variables (vcr, Iprim) to control the switches of the resonant converter. Such dynamic issues can occur, because in frequency controlled converters, the duration of a half-cycle is defined, but for a given duration, the trajectory followed depends on the initial condition (Vcr, Iprim) of the half-cycle. Therefore, after a change in the power requiring a change in the duration, it can take several half-cycles to come to a new steady state situation. By directly using the state variables the initial condition is given, so both a begin and an end of each half cycle is well defined, therefore preventing or reducing such dynamic effects. In particular, the resonant tank variables (which may also be referred to as resonant-tank-operating-parameters) can be used to control sub-states of a low power mode of operation.

Examples disclosed herein can be used in applications that include a resonant converter, for example in power supplies for PC desktop computers, laptop computers, gaming computers, servers etc.

Annex

This annex provides further details of the so-called state plane representation of a resonant converter.

Figure 10:
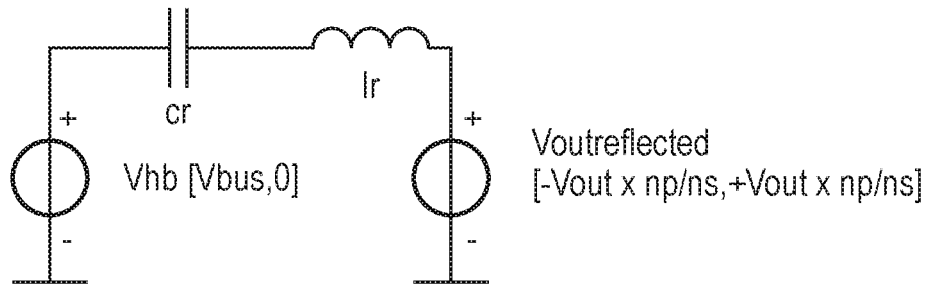
FIG. 10 shows a basic LLC converter.

FIG. 10 shows a basic LLC converter comprising a resonant capacitor (cr), a resonant inductor (Ir), an input voltage source Vhb [Vbus, 0] that represents the voltage at the half-bridge node, and a reflected voltage source Voutreflected [−Vout×np/ns, +Vout×np/ns] that represents a reflected voltage from the secondary side of the transformer in accordance with a turns ratio of the transformer.

In the state plane representation, the voltage across the resonant capacitor Vcr is plotted against the primary current in the resonant tank Iprim. The voltage across the resonant components cr and Ir, Lm (see FIG. 10) depends on the state of the converter. FIG. 10 shows the situation when one of the secondary diodes conducts. This gives an Im (see FIG. 11) in parallel with a voltage source so that Im can be left out when analyzing the corresponding resonance between cr and Ir.

The state of the converter depends on the state of the switches (Hss, Lss) and the direction of the primary current, that forces a voltage Voutreflected and therefore also a voltage occurs across the resonant components, called Vforce (forcing voltage). The forcing voltage can now be drawn as a centre of an ellipse in the state plane diagram. Based on the resonating energy being: $W=0.5 \times cr \times Vcr^2$ for the capacitor; and $W=0.5 \times Ir \times IIr^2$ for the inductor, elliptical trajectories occur when plotting Vcr against Iprim (=IIr). With proper scaling, using equality of both energy equations, the current Iprim can be replaced by a voltage variable $V=I \times sqrt(Ir/cr)$, with $Zchar=sqrt(Ir/cr)$. Zchar can be referred to as 'characteristic impedance'. If now Vcr is plotted against $V=I \times Zchar$, circles occur with their centres being Vforce, while time is represented by a (clockwise) rotating vector pointing from Vforce to a point on the circle. The energy stored in the resonance is represented by the radius of the circle. ($W=0.5 \times cr \times R2$, with R the radius of the circle).

The several combinations for both voltages Vhb and voutreflected of FIG. 10 gives the possibilities (states) that are shown in the below table. Hss stroke means that the Hss (or its body diode) conducts current, which means that Vhb=Vbus(+Vj). In the other case the Lss (or its body diode) conducts.

| state | HSS stroke | Iprim > 0 | Vforce |
|---|---|---|---|
| 0 | 0 | 0 | +Voutreflected |
| 1 | 0 | 1 | −Voutreflected |
| 2 | 1 | 0 | Vbus + Voutreflected |
| 3 | 1 | 1 | Vbus − Voutreflected |

For simplicity, the state where Hss and Lss are both not conducting is left out here.

Figure 11:
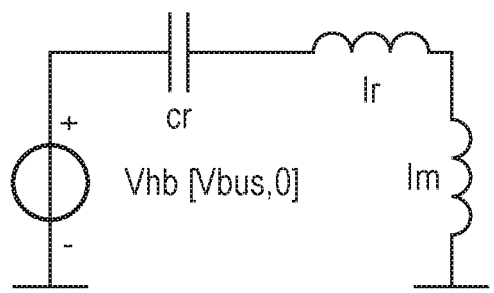
FIG. 11 shows a basic LLC converter with no conducting secondary diodes.

FIG. 11 shows the situation for an LLC converter when neither of the secondary diodes conducts. In this case the magnetizing inductance is not shorted by any source and therefore takes part of the resonance. The characteristic impedance is however Zchar1=sqrt(Ir+Im)/cr), which is larger than the characteristic impedance when Im is shorted. In the state plane diagram this gives an elliptical trajectory instead of a circle when using Zchar=sqrt(Ir/cr) as scaling for the vertical axis. In this situation there are only two possibilities, as represented by state 4 during the LSS conduction interval, giving Vforce=0 and state 5 during the HSS conduction interval, giving Vforce=+Vbus.

| state | HSS stroke | Vforce |
|---|---|---|
| 4 | 0 | 0 |
| 5 | 1 | +Vbus |

The invention claimed is:

1. A controller for a resonant converter, the resonant converter comprising a first switch and a second switch, the controller configured to:
    close the first switch to start a half cycle of operation;
    open the first switch before completion of the half cycle;
    maintain the first switch and the second switch in an open state in order to define a stop-interval; and
    end the stop-interval by closing the second switch;
wherein the controller is configured to operate the resonant converter in the following modes of operation:
    a high power mode of operation;
    a stop-preparation mode of operation;
    a stop mode of operation; and
    a start-preparation mode of operation;
wherein:
    in the high power mode of operation, the controller is configured to operate the first and second switches when a resonant converter operating parameter reaches one or more threshold values, wherein a half cycle of operation is defined as the period of time between successive switching operations;
    in the stop-preparation mode of operation, the controller is configured to close the first switch to start a half cycle of operation and open the first switch before completion of the half cycle;
    in the stop mode of operation, the controller is configured to maintain the first switch and the second switch in an open state; and
    in order to transition from the stop-mode of operation to the start-preparation mode of operation, the controller is configured to close the second switch.

2. The controller of claim 1, wherein the controller is configured to define the beginning of the stop-preparation mode of operation as an instant in time at which the first switch is closed.

3. The controller of claim 1, wherein the controller is configured to define the end of the start-preparation mode of operation as an instant in time at which the first switch is closed for the second time after the end of the stop interval.

4. The controller of claim 1, wherein the start-preparation mode of operation includes at least four operations of the second switch, including the operations that define the start and the end of the start-preparation mode of operation.

5. The controller of claim 1, wherein the controller is configured to define the end of the start-preparation mode of operation as an instant in time at which the first switch is closed for the first time after the end of the stop interval.

6. The controller of claim 1, wherein the controller is configured to define the end of the start-preparation mode of operation as an instant in time at which a resonant converter operating parameter reaches one or more threshold values.

7. The controller of claim 1, wherein the controller is configured to:
    operate the resonant converter in a continuous conduction mode of operation,
    apply an offset to one or more threshold values in accordance with an expected-difference-value in order to determine one or more offset-threshold values; and
    for the first switching operation after the beginning of the start-preparation mode of operation, operate the first and second switches when the resonant converter operating parameter reaches the one or more offset-threshold values.

8. The controller of claim 7, wherein the expected-difference-value represents a difference between a level of the resonant converter operating parameter at the end of a half cycle in the high power mode of operation; and a level of the resonant converter operating parameter at the first switching operation after the beginning of the start-preparation mode of operation.

9. The controller of claim 8, wherein the expected-difference-value is a predetermined value.

10. The controller of claim 1, wherein the controller is configured to, in the stop-preparation mode of operation, close and then open the second switch after the first switch is opened.

11. The controller of claim 1, wherein the first switch is a high-side-switch and the second switch is a low-side switch.

12. A resonant converter comprising:
    a first switch;
    a second switch; and
    the controller of claim 1, configured to control the first switch and the second switch.

13. An integrated circuit comprising the controller of claim 1.

14. A method of operating a resonant converter, the resonant converter comprising a first switch and a second switch, the method comprising:
    closing the first switch to start a half cycle of operation;
    opening the first switch before completion of the half cycle;
    maintaining the first switch and the second switch in an open state in order to define a stop-interval; and
    ending the stop-interval by closing the second switch;
wherein the method includes operating the resonant converter in the following modes of operation:
    a high power mode of operation;
    a stop-preparation mode of operation;
    a stop mode of operation; and
    a start-preparation mode of operation;
wherein:
    in the high power mode of operation, the controller is configured to operate the first and second switches when a resonant converter operating parameter reaches one or more threshold values, wherein a half cycle of operation is defined as the period of time between successive switching operations;
    in the stop-preparation mode of operation, the controller is configured to close the first switch to start a half cycle of operation and open the first switch before completion of the half cycle;

in the stop mode of operation, the controller is configured to maintain the first switch and the second switch in an open state; and in order to transition from the stop-mode of operation to the start-preparation mode of operation, the controller is configured to close the second switch.

* * * * *